Dec. 30, 1952 J. F. DAWSON 2,623,415
COMBINED TOOL FOR SAW TEETH
Filed Jan. 3, 1950

INVENTOR
JASPER F. DAWSON

BY *Gustave Miller*
ATTORNEY

Patented Dec. 30, 1952

2,623,415

UNITED STATES PATENT OFFICE 2,623,415

COMBINED TOOL FOR SAW TEETH

Jasper F. Dawson, Butte, Mont.

Application January 3, 1950, Serial No. 136,564

4 Claims. (Cl. 76—80)

This invention relates to a combined tool for saw teeth and has for an object to provide an improved combined tool for installing and removing separable saw teeth from a new blade.

A further object of this invention is to provide an improved tool for installing and removing separable saw teeth of the nature herein disclosed and of the nature disclosed in applicant's pending application, Ser. No. 104,788, filed July 14, 1949.

A further object of this invention is to provide an improved separable saw tooth over that disclosed in the aforementioned pending application.

A further object of this invention is to provide an improved saw tooth installing and removing tool wherein the tooth removing portion serves as a handle for the tooth installing portion, and vice versa, where the tooth installing portion serves as an operating handle for the tooth installing portion.

A further object of this invention is to provide a tooth installing portion which may be made in more than one form, in one form, having a hammer platform which is off center to the tooth engaging end, and in another form, having a hammer platform which is in axial alignment with the tooth engaging end.

A further object of this invention is to provide a separable tooth of an improved nature over that disclosed in the aforementioned pending application, including all the advantages previously disclosed, and including features making it easier to manufacture.

With the foregoing and other objects as will hereinafter become apparent, this invention includes the constructions, combinations, and arrangements of parts hereinafter disclosed, claimed, and illustrated on the accompanying drawing, wherein:

Figure 3:
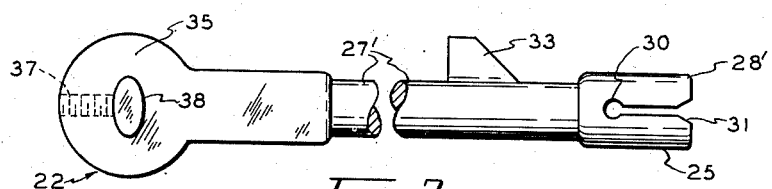
Fig. 3 is a similar view of another form.

There is shown at 10 a saw blade provided with a plurality of saw tooth bases 11 each shaped to receive and support a removable saw tooth 12, the tooth 12 being installed and removed from the base 11 by means of the combined tool 14 of this invention.

The tooth 12 is provided with a pair of extending spring fingers 15 and 16 at a V angle to each other and connected to each other by a rounded apex 17. Each spring finger 15 and 16 terminates in an internally (to the V) extending anchor tip 18 to cooperate with and anchor in the base notches 20 and firmly hold the tooth in position thereon. To assist the teeth 12 in remaining firmly anchored on the blade except when intentionally removed by the tool 14, the inner edges of the fingers 15 and 16 are V-grooved at 19 between the anchor tips 17 and the rounded apex 18. The ends of the tips 18 are slightly V-grooved at 21 for the purpose of aligning the tooth on edges 22 while tooth is being forced on to saw projection.

The base 11 on the blade is shaped complementary to the tooth 12, except at 20 which is without the V (to simplify shaping) provided with its edges V-shaped in cross section at 22 between a rounded apex 23 and the rounded anchor tip receiving notches 20. The V angle between the fingers 15 and 16 is slightly more acute than that between the edges 22 of the base 11 so that there is a positive spring effect assisting in holding the tooth 12 on the base 11. Also, the cutting edge 24 of the tooth 12 may be resharpened a number of times, as shown at 24'.

The combined tool 14 for installing and removing the tooth 12 on and from the base 11 consists of a tooth installing end portion 25 and a tooth removing end portion 26, connected together by a handle stem 27.

Figure 1:
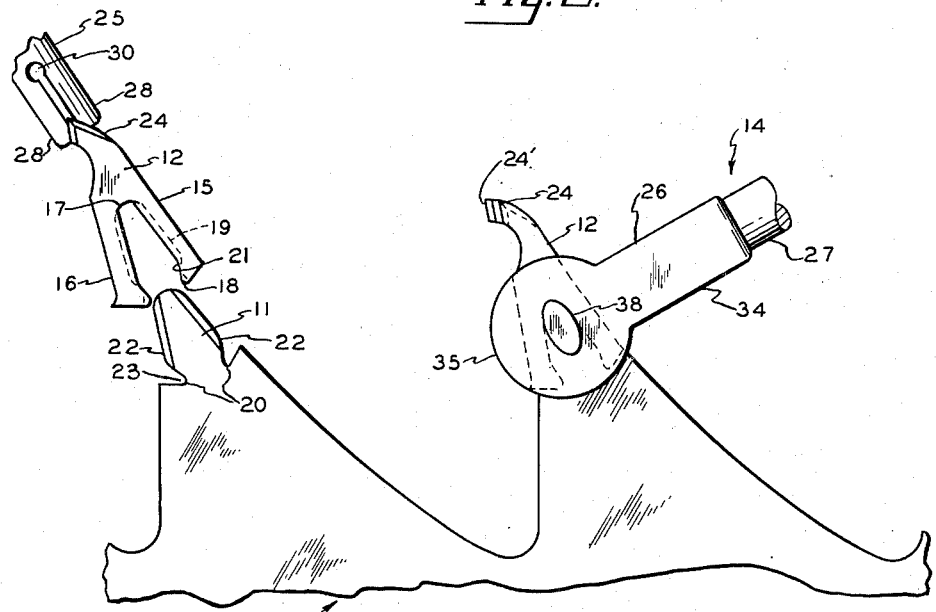
Fig. 1 is a plan view showing the invention in operation.

The tooth installing end 25 is bifurcated into two closely spaced fingers 28 joined together by a circular apex 30. The ends of the fingers 30 are provided with diverging faces 31 forming a V complementary to the V present at the cutting edge 24 of the tooth 12, whereby when the tooth installing end portion 25 is placed thereover in operating position as shown in Fig. 1, the tooth 12 is firmly contacted on opposite sides of the cutting edge 24, but the cutting edge 24 extends slightly into the space between the tool fingers 28, and thus there is no dulling effect provided by the tool in use.

With the tool placed against the end of the tooth, it may be pushed into place on the base 11, or more easily, when the tooth is placed with its V-grooves aligned on the V-edges 22 of the base 11, the tool is struck sharply with a hammer on the hammer platform 32 or 33, causing the spring fingers 15 and 16 to yield enough to let the anchor tips 18 ride on their slight V groove along the edges 22 and snap into the notches 20 and hold firmly therein, due to the fact that the unsprung distance between the tooth tips 18 is slightly less than the distance between the notches 20.

Figure 2:
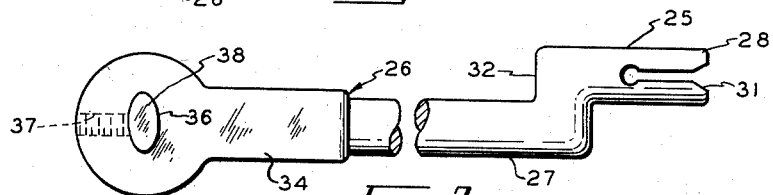
Fig. 2 is a side elevational view of one form of the combined tool.

In the form shown in Fig. 2, the hammer platform 32 is concentric with and directly behind the tooth installing fingers 28 and V faces 31, the handle stem 27 being thus offset with relation to the platform 32.

Figure 4:
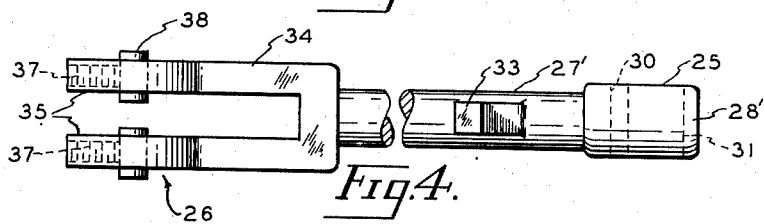
Fig. 4 is a view of the form of Fig. 3, rotated 90° therefrom.

In the form shown in Figs. 3 and 4, the hammer platform 33 is off center to the tool finger V faces 31 and extends off one side of the handle stem 27' which in turn, is axially aligned with the tool V faces 31. Also, in this form the tool fingers 28' are of enlarged diameter with relation to the stem 27', thus providing a greater mass at the pushing end compensating for the off set of the hammer platform 33.

The tooth removing tool end portion 26 consists of a pair of spaced apart arms 34 terminating in enlarged hands 35. Each hand 35 is provided with a centrally located oval opening 36 to which extends a threaded aperture 37. The arms 34 are spaced apart possibly twice or so the thickness of the saw blade 10, and inserted in each oval opening 36 is an oval cam 38 considerably thicker than the thickness of the arms 34 so that they may extend through the openings to a distance apart just greater than the thickness of the blade 10 but less than the thickness of the tooth fingers 15 and 16.

When it is desired to remove a tooth 12 from the blade base 11, the tool is manipulated to bring the cams to opposite sides of the blade 10 and then moved to cause the long axis of the cams between the tooth fingers 15 and 16 on the blade base 11 to the position shown at the right in Fig. 1. Then when in this position, the tool handle 27 is rotated about the cams as a center, causing the cams 38 to spread the tooth fingers 15 and 16 apart until the finger anchor tips 18 leave the notches 20 and let the tooth snap off the base. The teeth may be resharpened at 24' while in position on the blade 10, or when worn out, may be replaced by other teeth.

While the preferred form of this invention has been shown and described, it will be understood that this invention is not limited to the particular details described and illustrated and that changes may be made within the scope of what is hereinafter claimed.

Having thus set forth and disclosed the nature of this invention, what is claimed is:

1. For use in removing a separable saw tooth from a saw blade wherein the saw tooth has diverging spring fingers and converging anchor tips at the ends of the spring fingers, and the saw blade has a complementary tooth receiving base, the saw tooth being of greater thickness than the saw tooth base and extending on each side thereof; a tool comprising a longitudinal handle, a tooth removing cam tool provided at one end of said handle, said cam tool comprising bifurcated cam tool fingers, each finger having one of a pair of inwardly extending cams arranged to be spaced apart a distance greater than the thickness of the saw tooth base and less than the thickness of the saw tooth, whereby the cams may be manipulated by the handle to between the tooth fingers on the blade base and then rotated to spread the tooth fingers apart and thus remove the tool from its base.

2. For use in connection with a saw blade having separable saw teeth wherein the teeth are thicker than the saw blade and have V extending spring fingers having inwardly extending tips and the saw blade has tooth bases complementary to the saw teeth but of greater width than the unsprung distance between the teeth spring fingers; a tooth removing tool comprising a longitudinal handle, a pair of arms at one end spaced apart a distance greater than the thickness of the saw blade, an enlarged hand at the end of each arm, an oval aperture extending transversely through each hand, said oval apertures being opposite each other, an oval cam of greater thickness than the hand, means for adjustably securing each oval cam in its aperture spaced apart from each other a distance slightly greater than the thickness of the saw blade and less than the thickness of the saw teeth, whereby the cams may be manipulated by the handle to between the tooth fingers on the blade base and then rotated to spread the tooth fingers apart and thus remove the tooth from its base.

3. For use with a forked saw tooth comprising a saw tooth point and a pair of extending diverging spring anchor fingers, each anchor finger including a converging anchor tip, and a saw blade including a projecting saw tooth base having oppositely disposed anchor notches, the saw tooth being of greater thickness than said blade and extending on each side of said saw blade, a bifurcated cam tool including a pair of inwardly extending oval cams arranged to be adjustably spaced apart a distance greater than the thickness of the saw blade and less than the thickness of said saw tooth, the minor diameter of said oval cams being less than the distance between said anchor tips and the major diameter being greater than said anchor tip distance and less than the length of said saw tooth spring anchor fingers, whereby said cam tool may arrange said oval cams on either side of said saw blade to enter between said saw tooth spring anchor fingers and be rotated to spring said fingers and anchor tips apart to detach said tooth from said blade.

4. For use with a forked saw tooth having a saw tooth point and a pair of extending diverging spring anchor fingers, each anchor finger including a converging anchor tip, and a saw blade including a projecting saw tooth base having oppositely disposed anchor notches, the saw tooth being of greater thickness than said blade and extending on each side of said saw blade; a bifurcated cam tool including a pair of inwardly extending oval cams arranged to be spaced apart a distance greater than the thickness of the saw blade and less than the thickness of said saw tooth, the minor diameter of said oval cams being less than the distance between said anchor tips and the major diameter being greater than said anchor tip distance and less than the length of said saw tooth spring anchor fingers, whereby said cam tool may arrange said oval cams on either side of said saw blade to enter between said saw tooth spring anchor fingers and be rotated to spring said fingers and anchor tips apart to detach said tooth from said blade.

JASPER F. DAWSON.

REFERENCES CITED

The following references are of record in the file of this patent:

UNITED STATES PATENTS

| Number | Name | Date |
| --- | --- | --- |
| 892,228 | Damon | June 30, 1908 |
| 1,195,143 | McDonald | Aug. 15, 1916 |
| 2,275,393 | Myers et al. | Mar. 3, 1942 |